United States Patent [19]

Yokoyama

[11] Patent Number: 4,942,403

[45] Date of Patent: Jul. 17, 1990

[54] PHASED-ARRAY RADAR

[75] Inventor: Hiroshi Yokoyama, Tokyo, Japan

[73] Assignee: NEC Corporation, Tokyo, Japan

[21] Appl. No.: 281,395

[22] Filed: Dec. 8, 1988

[30] Foreign Application Priority Data

Dec. 11, 1987 [JP]  Japan .................. 62-313289

[51] Int. Cl.⁵ ......................... H01Q 3/22; G01S 13/00
[52] U.S. Cl. ...................................... 342/372; 342/88
[58] Field of Search ................... 342/371, 372, 81, 88, 342/137

[56] References Cited

U.S. PATENT DOCUMENTS 4,049,953  9/1977  Evans, Jr. ........................... 342/137
4,143,373  3/1979  Chernick .............................. 342/88
4,573,050  2/1986  Waters ................................ 342/372

Primary Examiner—Gregory C. Issing
Attorney, Agent, or Firm—Foley & Lardner, Schwartz, Jeffery, Schwaab, Mack, Blumenthal & Evans

[57] ABSTRACT

A phased-array radar capable of electronically directing a directional beam of an antenna in any of N different directions, i.e., direction $\theta_1$ to direction $\theta_N$. Scanning of the directional beam is effected in any of a long-range mode for detecting and tracking a target cruising at a long range from the radar and a short-range mode detecting and tracking a target cruising at a short range. This reduces the data rate and thereby increases the target information updating frequency associated with a short-range target.

5 Claims, 3 Drawing Sheets

PHASED-ARRAY RADAR

BACKGROUND OF THE INVENTION

The present invention relates to a radar and, more particularly, to a phased-array radar having an improved detecting and tracking ability.

Generally, the data rate of target information update time required of a radar adapted to detect and track an object is dependent upon the range from the radar to an object or target, the direction and velocity of movemement of the target, etc. To enhance, among others, the ability of detecting and tracking a target cruising at a relatively short range, it is necessary that the data rate be made lower than the data rate associated with a long-range target. A drawback with a prior art phased-array radar is that the data rate is constant and therefore not always sufficient for a short-range target, resulting in poor detecting and tracking perforemance.

SUMMARY OF THE INVENTION

It is therefore an object of the present invention to provide a phased-array radar which achieves an improved ability for detecting and tracking a short-range target by scanning a directional beam of an antenna in two different modes, i.e., a mode for detecting and tracking of long-range target and a mode for detecting and tracking a short-range target and reducing the data rate associated with a short-range target to increase the target information updating frequency.

It is another object of the present invention to provide a generally improved phased-array radar.

A phased-array radar capable of electronically directing a directional beam of an antenna in any of N different directions, i.e., direction $\theta_1$ to direction $\theta_N$. The present invention comprises a transmit trigger generator responsive to a control signal for selectively setting a high transmit repetition frequency and a low transmit repetition frequency, a beam direction control responsive to a direction command signal for detecting the directional beam of the antenna in a designated direction, and a radar control for generating the control signal and the direction command signal. The radar control controls the transmit trigger generator and beam direction control such that when the low transmit repetition frequency is selected, the directional beam is directed in one direction for a predetermined period of time and then continuously directed in a pluarlity of different directions for a predetermined period of time each at the high transmit repetition frequency. The radar control repeats such a procedure to command the directions $\theta_1$ to $\theta_N$ at the low transmit repetition frequency while commanding the directions $\theta_1$ to $\theta_N$ a plurality of times each at the high transmit repetition frequency.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
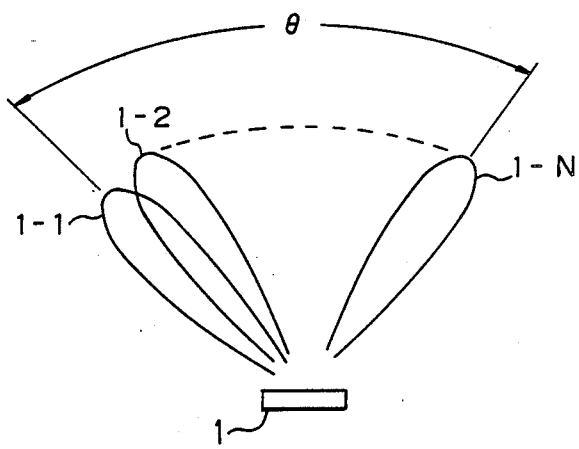
FIG. 1 is a diagram schematically showing beam scanning effected by a prior art phased-array radar.
Figure 2:
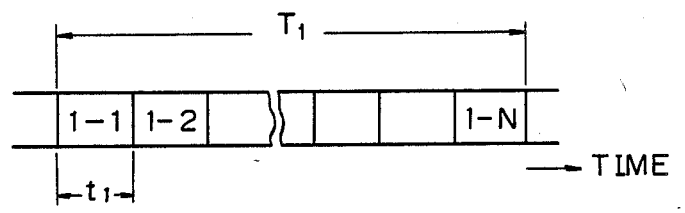
FIG. 2 demonstrates the operation of the prior art phased-array radar with respect to time sequence.

To better understand the present invention, a brief reference will be made to beam scanning which is particular to a prior art phased-array radar, shown in FIGS. 1 and 2. As shown in FIG. 1, a phased-array radar 1 defines an azimuth coverage $\theta$ by using N beams 1—1, 1-2, ..., 1-N which are formed one after another electronically. Hence, assuming that the observation time per beam is $t_1$, it will be seen from FIG. 2 that a period of time $T_1$ needed to search the whole azimuth covera.e 74 once is in principle:

$$T_1 = N \cdot t_1 \tag{1}$$

This period of time $T_1$ is known as data rate or target information update time. A problem heretofore pointed out with such a radar is that since the data rate represented by the time $T_1$ is usually constant, it is not always sufficient for detecting and tracking a target located at a short range and results in poor detecting and tracking performance.

Figure 3:
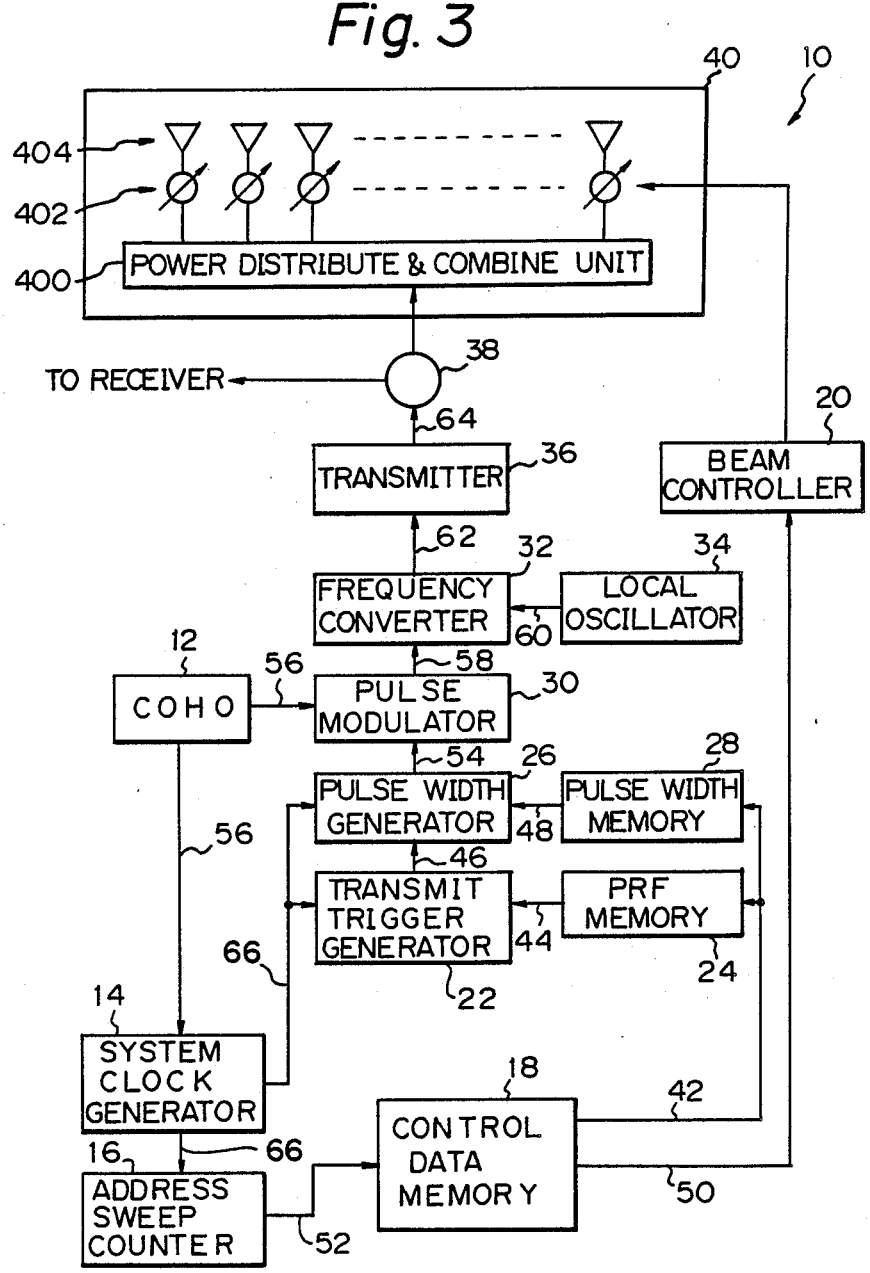
FIG. 3 is a block diagram schematically showing a phased-array radar embodying the present invention.

Referring to FIG. 3, a phased-array radar embodying the present invention is shown and generally designated by the reference numberal 10. As shown, the phased-array radar 10 includes a coho 12, a system clock generator 14, an address sweep counter 16, a control data memeory 18, a beam controller 20, a transmit trigger generator 22, a PRF (Pulse Repetition Frequency) memory 24, a pulse width generator 26, a pulse width memory 28, a pulse modulator 30, a frequency converter 32, a local oscillator 34, a transmitter 36, a duplexer 38, and an antenna 40. The antenna 40 consists of a power distributing and combining unit 400, a plurality of phase shifters 402, and radiating elements 404 each being associated with a respective one of the phase shifters 402.

The control data memory 18 delivers a control signal 42 to the PRF memory 24 which in turn feeds an output signal 44 thereof to the transmit trigger generator 22. In response, the transmit trigger generator 22 produces a trigger signal 46 the transmit repetition frequency of which is controllable to a high frequency or a low frequency, as described in detail later. The transmit pulse width is also controllable to a large width or a small width simultaneoulsy with the selection of the transmit repetition frequency. More specifically, as the control signal 42 is fed from the control data memory 18 to the pulse width memory 28, the pulse width memory 28 delivers to the pulse width generator 26 a signal 48 for selecting either the large width or the small width. The relation between the transmit pulse width and the transmit repetition frequency is such that the small pulse width is selected when the high repetition frequency is selected and, conversely, the large pulse width is selected when the low repetition frequency is selected. The large transmit pulse width means that the mean transmission power is increased to allow a long-range to be detected, and the low transmit repetition frequency means that the transmit pulse interval is increased to guarantee a period of time for receiving a reflection from a long-range target. Hence, the large transmit pulse width and low transmit repetition frequency provide an operation mode suitable for detecting a long-range target, i.e. long-range mode. On the other hand, the small transmit pulse width and high transmit repetition frequency provide an operation mode suitable for detecting a short-range target, i.e. short-range mode.

The control data memory 18 further delivers a direction command signal 50 to the beam controller 20. The direction command signal 50 designates at the low transmit repetition frequency N different directions, i.e., directions $\theta_1$ to $\theta_N$ in the azimuth coverage $\theta$ of the beam which issues from the antenna 40 while designating at the high transmit repetition frequency the N different beam directions a plurality of times each. Assume that the periods of time during which the beam is radiated in one direction when the low transmit repetition frequency is selected and when the high transmit repetition frequency is selected are $t_1$ and $t_2$, respectively, and that the number of different directions in which the beam is to be sequentially directed when the high transmit repetition frequency is selected is k. Then data rates $T_2$ and $T_3$ associated with the direction of a long-range target and a short-range target, respectively, are expressed as follows:

$$T_2 = Nt_1 + kNt_2 \quad (2)$$

$$T_3 = \frac{N}{k} t_1 + Nt_2 \quad (3)$$

It will be clear from the equations (2) and (3) that the data rate $T_3$ is one-k-th of the data rate $T_2$. Once the range of the data rate $T_2$ and that of the data rate $T_3$ needed for the detection of a long-range target and a short-range target, respectively, are determined, $t_1$, $t_2$ and k which lie in such ranges can be selected by using the equations (2) and (3).

Receiving the direction command signal 50, the beam controller 20 controls the amount of phase shift of each phase shifter 402 and therey the directions of the beams issuing from the antenna 40.

As stated above, the transmit repetition frequency, transmit pulse width and beam direction are controlled in association with each other by the control signal 42 and direction command signal 50 which are fed from the control data memory 18. Specific control data which may be adopted for an exemplary case of k=2 are listed in Table 1 below.

TABLE 1

| ADDRESS NO. | TRANSMIT REPETITION FREQ | BEAM DIRECTION |
|---|---|---|
| 1 | low | $\theta_1$ |
| 2 | high | $\theta_1$ |
| 3 | high | $\theta_2$ |
| 4 | low | $\theta_2$ |
| 5 | high | $\theta_3$ |
| 6 | high | $\theta_4$ |
| 7 | low | $\theta_3$ |
| 8 | high | $\theta_5$ |
| 9 | high | $\theta_6$ |
| 10 | low | $\theta_4$ |
| 11 | high | $\theta_7$ |
| 12 | high | $\theta_8$ |
| 13 | low | $\theta_5$ |
| 14 | high | $\theta_9$ |
| 15 | high | $\theta_{10}$ |
| . | . | . |
| . | . | . |
| . | . | . |

The address sweep counter 16 feeds an address signal 52 to the control data memory 18 to cause the latter to sequentially designate address numbers. Then, the control data memory 18 sequentially outputs the control signal 42 for selecting the high or low transmit repetition frequency and the large or small transmit pulse width and the direction command signal 50 for commanding the instantaneous orientation of the beams.

Figure 4:
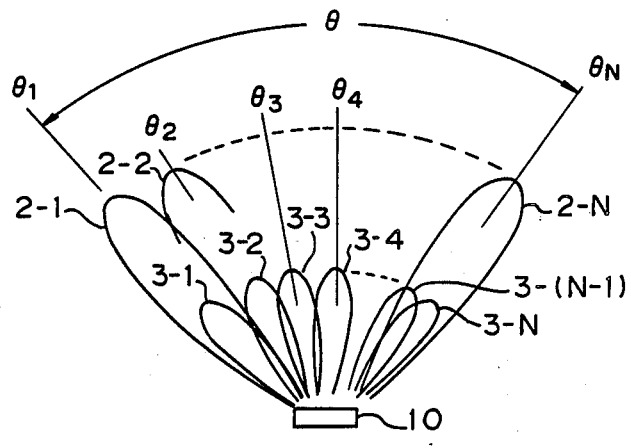
FIG. 4 is a diagram similar to FIG. 1, showing long-range mode beams and short-range mode beams attainable with the radar of FIG. 3.
Figure 5:
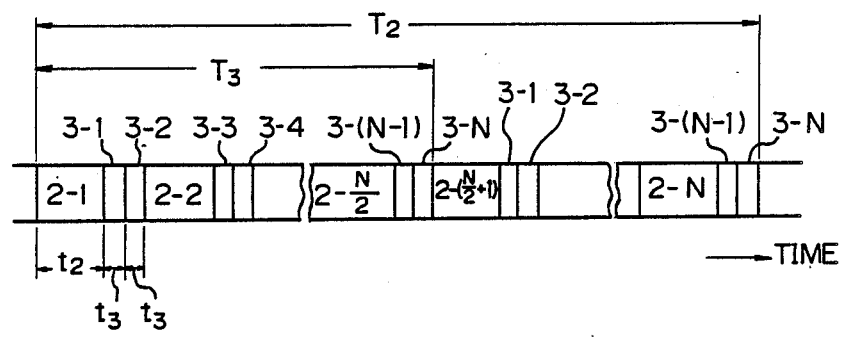
FIG. 5 shows the operation of the radar of FIG. 3 with respect to time sequence.

A reference will be made to FIGS. 4 and 5 for describing beam scanning which is particular to the illustrative embodiment. In FIG. 4, long-range mode beams and short-range mode beams are labeled 2-1, 2—2, ..., 2-N and 3-1, 3-2, ..., 3-N, respectively. FIG. 5 shows periods of times for forming the respective beams. In FIG. 5, $t_2$ and $t_3$ are respectively representative of an observation time per one bearing of long-range mode beam and an observation time per one bearing of shtort-range mode beam. Labeld $\theta_1$, $\theta_2$, ..., $\theta_N$ are azimuth angles of the respective beams. Assuming that k is 2 by way of example, the bearing $\theta_1$ is observed by the long-range mode beam 2-1 and then the bearings $\theta_1$ and $\theta_2$ are sequentially observed by the short-range mode beams 3-1 and 3-2. Subsequently, the bearing $\theta_2$ is observed by the long-range mode beam 2—2 and then the bearings $\theta_3$ and $\theta_4$ are sequentially observed by the short-range mode beams 3—3 and 3-4. Such a procedure is repeated over the entire azimuth coverage $\theta$. Hence, the short-range mode beams 3-1, 3-2, ..., 3-N are capable of observing the whole azimuth coverage $\theta$ twice while the long-range mode beams 2-1, 2—2, ..., 2-N observe it once.

It will be seen from FIG. 5 that the data rate $T_2$ of the long-range mode beams and the data rate $T_3$ of the short-range mode beams are produced by:

$$T_2 = Nt_2 + 2Nt_3 \quad (4)$$

$$T_3 = \frac{N}{2} t_2 + Nt_3 \quad (5)$$

Let $t_2 = t_1$ and $t_3 = t_2/4$ hold in the equation (1). Then, from the equations (4) and (5), $T_2$ and $T_3$ are expressed as:

$$T_2 = 1.5 \, T_1 \quad (6)$$

$$T_3 = 0.75 \, T_1 \quad (7)$$

The radar of the illustrative embodiment, therefore, realizes data rate of long-range mode beams which is 1.5 times greater than the prior art and a data rate of short-range mode beams which is only three-fourths of the prior art and is half the data rate of long-range mode beams.

A pulse signal 54 having predetermined transmit repetition frequency and a predetermiend pulse width is fed from the pulse width generator 26 to the pulse modultor 30. In response, the pulse modulator 30 modulates a high-frequency continuous wave 56 which is applied thereto from coho 12, thereby generating a high-frequency pulse signal 58. Applied to the frequency converter 32, the high-frequency pulse signal 58 is combined with a signal 60 from the local oscillator 34 to become a signal 62 having a higher frequency. The signal 62 is fed to the transmitter 36 for power amplification. The resulting power-amplified high-frequency pulse signal 64 is routed through the duplexer 38 to the power distributing and combining unit 400 of the antenna 40. Then, the circuit 400 distributes the signal 64 to the phase shifters 402 and therefrom to the radiating elements 404. Consequently, the pulse signal 64 is radiated from the radiating elements 404 to the space in predetermined beam directions. Reflections from a target are combined by power distributing and combining circuit 400 of th antenna 40, the resulting signal being fed to a receiver (not shown) via the duplexer 38.

The coho 12 generates the previously mentioned signal 56 on which a transmit wave and a clock signal of the illustrative embodiment are based. The signal 56 is fed to the pulse modulator 30 as stated earlier and also to the system clock generator 14. By the system clock generator 14, the signal 56 is couned down to become a system clock 66 for regulating the operation timings of the entire radar 10. The system clock 66 is fed to the receiver as well as to the address sweep counter 16, transmit trigger generator 22, and pulse width generator 26.

In summary, it will be seen that the present invention provides a phased-array radar in which a transmit repetition frequency and a beam direction of an antenna are controlled at the same time as each other. More specifically, a beam is oriented in one direction for a predetermined period of time at a low transmit repetition frequency and then sequentially oriented in a plurality of different directions for a predetermined period of time each at a high transmit repetition frequency, and such a procedure is repeated. Hence, N different directions, i.e., directions $\theta_1$ to $\theta_N$ are sequentially scanned a plurality of times at the high frequency while the N directions are scanned at the low transmit frequency once. This allows the data rate associated with the high transmit repetition frequency to be made lower than the data rate associated with the low transmit repetition frequency, enhancing the detecting and tracking performance of a radar for a short-range target.

Various modifications will become possible for those skilled in the art after receiving the teachings of the present disclosure without departing from the scope thereof. For example, the ratio k between the long-range mode beams and the short-range mode beams may be changed to 1:3 or the like as desired. The sequence of beam forming directions shown and described is only illustrative and may be replaced with any other sequence so long as it is capable of completing the azimuth coverage $\theta$ within a predetermined period of time. The present invention is applicable not only to a phase array radar having a scanning function in the azimuthal direction but also to a phase array radar having it in the elevational direction.

What is claimed is:

1. A phased-array radar capable of electronically directing a directional beam of an antenna in any of N different directions, i.e., direction $\theta_1$ to direction $\theta_N$, comprising:

transmit trigger selector means responsive to a control signal for selectively setting a high transmit repetition frequency and a low transmit repetition frequency;

beam direction control means responsive to a direction command signal for directing the directional beam of said antenna in a designated direction; and radar control means for generating the control signal and the direction command signal;

said radar control means controlling said transmit trigger selector means and said beam direction control means such that when the low transmit repetition frequency is selected, the directional beam is directed in one direction for a predetermined period of time and then continuously directed in a plurality of different directions for a predetermined period of time each at the high transmit repetition frequency;

said radar control means repeating said procedure to command the directions $\theta_1$ to $\theta_N$ at the low transmit repetition frequency while commanding the directions $\theta_1$ to $\theta_N$ a plurality of times each at the high transmit repetition frequency.

2. A radar as claimed in claim 1, wherein said transmit trigger selector means comprises:

a PRF (Pulse Repetition Frequency) memory;

a transmit trigger generator supplied with an output of said PRF for generating a transmit trigger signal, the transmit trigger signal having the high and low transmit repetition frequencies;

means for selecting either one of the high or low pulse repetition frequencies in response to data which is fed from a control data memory.

3. A radar as claimed in claim 2, further comprising pulse width selector means for selecting one of a large and a small transmit pulse width of the transmit trigger signal.

4. A radar as claimed in claim 3, wherein said pulse width selector means comprises:

a pulse width memory supplied with the control signal for selecting a pulse width signal representative of a pulse width;

a pulse width generator supplied with the pulse width signal from said pulse width memory for generating a pulse signal having a predetermined pulse width dependent on said high or low pulse repetition frequency;

means for selecting data stored in the pulse width memory in response to data fed from the control data memory.

5. A radar as claimed in claim 1, wherein said radar control means comprises a control data memory for storing a control data table.

* * * * *